United States Patent [19]
Wieres

[11] Patent Number: 6,029,488
[45] Date of Patent: Feb. 29, 2000

[54] APPARATUS AND PROCESS FOR PRODUCING A HONEYCOMB BODY FROM INTERTWINED SHEET METAL LAYERS

[75] Inventor: Ludwig Wieres, Overath, Germany

[73] Assignee: Emitec Gesellschaft fuer Emissionstechnologie mbH, Lohmar, Germany

[21] Appl. No.: 08/996,372

[22] Filed: Dec. 22, 1997

Related U.S. Application Data

[63] Continuation of application No. PCT/EP96/02184, May 21, 1996.

[30]   Foreign Application Priority Data

Jun. 20, 1995 [DE] Germany ............................ 195 22 327

[51] Int. Cl.[7] ................................................. B21C 47/00
[52] U.S. Cl. .............................................. 72/146; 29/890
[58] Field of Search ............................... 29/890; 72/147, 72/146, 148; 228/181, 173.6

[56]   References Cited

U.S. PATENT DOCUMENTS

| | | | |
|---|---|---|---|
| 3,857,680 | 12/1974 | Porta et al. ........................... | 23/288 K |
| 3,890,104 | 6/1975 | Porta et al. ........................... | 23/288 K |
| 3,958,312 | 5/1976 | Weaving et al. ...................... | 29/157 R |
| 4,163,042 | 7/1979 | Lynch ..................................... | 422/179 |
| 4,382,323 | 5/1983 | Chapman et al. ..................... | 29/157 R |
| 4,923,109 | 5/1990 | Cyron ..................................... | 228/181 |
| 4,958,428 | 9/1990 | Humpolik ................................ | 29/890 |
| 5,096,111 | 3/1992 | Ishikawa et al. .................... | 228/173.2 |
| 5,105,539 | 4/1992 | Maus et al. ............................. | 29/890 |
| 5,145,539 | 9/1992 | Horikawa et al. ..................... | 156/89 |
| 5,608,968 | 3/1997 | Maus et al. ............................. | 29/890 |
| 5,724,735 | 3/1998 | Ickes et al. ............................. | 29/890 |
| 5,846,495 | 12/1998 | Whittenberger et al. ............... | 422/180 |

FOREIGN PATENT DOCUMENTS

0569109A1  11/1993  European Pat. Off. .......... F01N 3/28

*Primary Examiner*—Lee Young
*Assistant Examiner*—Steve Blount
*Attorney, Agent, or Firm*—Herbert L. Lerner; Laurence A. Greenberg

[57]   ABSTRACT

An apparatus to produce a honeycomb body having a multiplicity of at least partially structured sheet metal layers forming a multiplicity of fluid-permeable passages. A fork-like intertwining device is rotatable about a central axis and engages each stack. A former surrounds the intertwining device and has an inner contour corresponding to an outer contour of the honeycomb body to be produced. At least one opening in a wall of the former for stack ends extends substantially parallel to the central axis. In a production of the honeycomb body, at least one stack is layered from a multiplicity of at least partially structured sheet metal layers. Each stack is introduced into a former corresponding to the external shape of the honeycomb body to be produced, with at least one end of each stack projecting out of the former through at least one opening. Each stack is held by an intertwining device rotatable about a central axis, in a central region. Each stack is intertwined by rotation of the intertwining device relative to the former to form a honeycomb body, with the stack ends being pulled into the former until the stacks fill the entire former.

23 Claims, 1 Drawing Sheet

U.S. Patent    Feb. 29, 2000    6,029,488
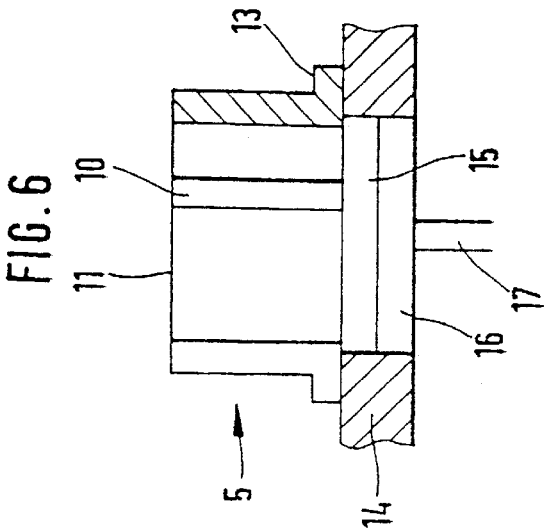
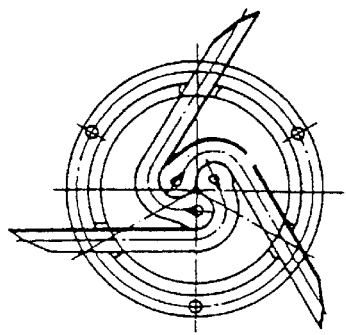
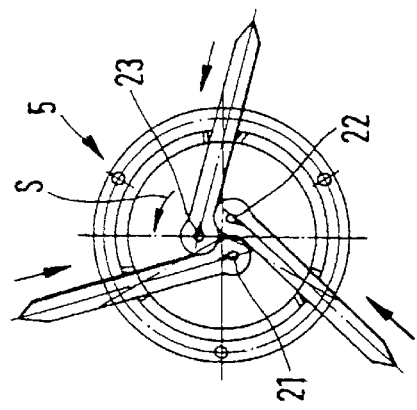
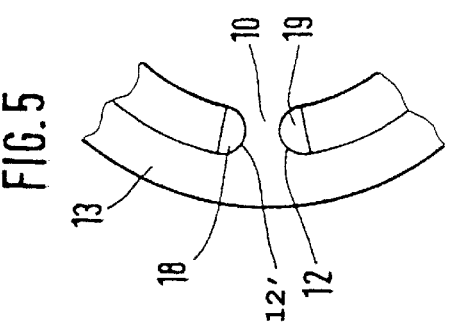
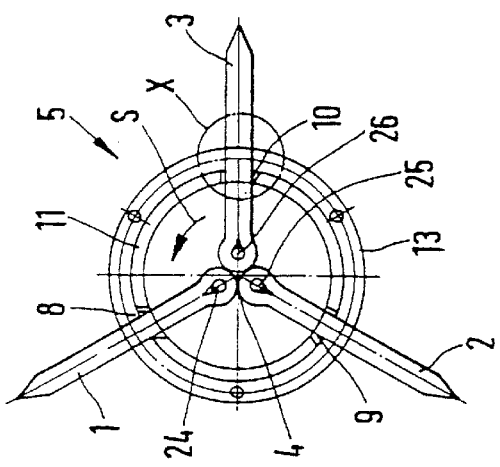
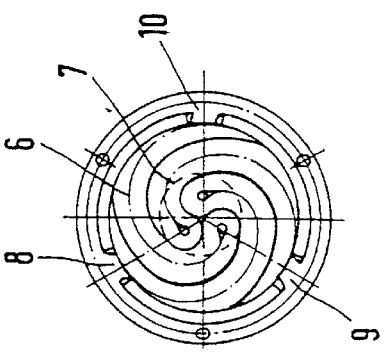

APPARATUS AND PROCESS FOR PRODUCING A HONEYCOMB BODY FROM INTERTWINED SHEET METAL LAYERS

CROSS-REFERENCE TO RELATED APPLICATION

This application is a continuation of International Application Serial No. PCT/EP96/02184, filed May 21, 1996, which designated the United States.

BACKGROUND OF THE INVENTION

1. Field of the Invention

The invention relates to apparatuses and processes for producing a honeycomb body having a multiplicity of at least partially structured sheet metal layers which form a multiplicity of passages through which a fluid can flow.

Catalyst carrier bodies are used to deal with the progressively increasing strictness of the provisions relating to the emission of pollutants, in particular from motor vehicles. Such catalyst carrier bodies may involve metallic honeycomb bodies. Such a honeycomb body includes, for example, a stack of a multiplicity of at least partially structured sheet metal layers. The stack is intertwined or twisted in opposite directions about itself and about a central region. Such a honeycomb body structure is known, for example, from U.S. Pat. No. 4,923,109. International Patent Publication WO 90/03220, corresponding to U.S. Pat. Nos. 5,139,844; 5,105,539 and 5,135,794, discloses a metallic catalyst carrier body for motor vehicles, which is made up of at least partially structured sheet metal layers. That catalyst carrier body includes at least three stacks of sheet metal layers, wherein at least three of the stacks are folded around a respectively associated bend line in the central region of the honeycomb body and in the folded condition are intertwined in the same direction around each other and around the central region with the bend lines.

Apparatuses which are known for producing such catalyst carrier bodies include a fork-shaped intertwining device that is rotatable about a central axis and which engages each stack, and former segments that close to form a former. The inner cross-section of the closed former corresponds to the cross-section of the honeycomb body in the wound condition. The most frequent form in which the honeycomb bodies are constructed is cylindrical. In order to ensure that the stacks are intertwined around themselves and around a central region, the former segments are moved towards the stack in such a way that during the rotary movement of the fork-shaped intertwining device, the stack or stacks bear against an edge of the former segments and that edge forms a support device. Towards the end of the production procedure the former is completely closed and thus imparts its definitive form to the honeycomb body.

The structural expenditure on such an apparatus is relatively high by virtue of the fact that the former includes two former segments which are movable towards and away from each other. During such a production process it is always necessary to ensure that the former segments move with a predetermined sequence of movements. Due to abrasion wear, dust or the like, guides of the former segments may suffer from receiving deposits therein, which can interfere with the movements that are involved.

In the known apparatuses for the production of a honeycomb body, in particular a catalyst carrier body, there is a danger of at least one former segment moving during the closing operation in opposite relation to the direction of movement of the portion of a stack which is still to be intertwined. When the former segment presses against the portion of the stack, that can give rise to undesired deformation of the stack or stacks. Deformation of the stack has the result of causing individual sheet metal layers to be partially bent. The structure of the finished honeycomb body is adversely affected thereby. On one hand the strength of the honeycomb body suffers and on the other hand the passage cross-sections experience a local change. The result of a change in the passage cross-sections is that it is no longer possible to guarantee a uniform flow distribution within the honeycomb body. However, the flow profile of an exhaust gas through a catalyst carrier body is a decisive factor in terms of the catalytic action of the catalytic converter.

SUMMARY OF THE INVENTION

It is accordingly an object of the invention to provide an apparatus and a process for producing a honeycomb body from intertwined sheet metal layers, which overcome the hereinafore-mentioned disadvantages of the heretofore-known apparatuses and methods of this general type and which prevent a risk of deformation of stacks or individual sheet metal layers from occurring during a production process. The invention further seeks to provide that the apparatus is less sensitive to environmental influences such as, for example, dust, dirt and the like.

With the foregoing and other objects in view there is provided, in accordance with the invention, an apparatus for producing a honeycomb body, in particular a catalyst carrier body, comprising at least one fork-like intertwining, winding or wrapping device each engaging a stack of a multiplicity of at least partially structured sheet metal layers forming a multiplicity of passages or channels through which a fluid can flow and each winding device rotating about a central axis; and at least one former each surrounding one winding device and having an invariable internal contour corresponding to an external contour of a honeycomb body to be produced, each former having a wall with at least one opening formed therein extended substantially parallel to the central axis for at least one stack end.

In contrast to the known apparatuses for producing a honeycomb body, the apparatus according to the invention does not involve former segments which are movable relative to each other. That provides an apparatus which is of a simple construction and is effective.

In accordance with another feature of the invention, in order to wind a stack it is particularly desirable if it is passed through two openings and is wound from the center. However, it is also possible to insert one or more stacks in a folded condition so that both ends of each stack each pass through a common opening. A stack can also be engaged at its end by the intertwining or winding device and intertwined in the manner of a multi-flight spiral. Finally, it is also possible for the intertwining device to squeeze together the engaged part of the stack so as to produce an approximately star-shaped center.

The apparatus according to the invention can preferably be used to produce honeycomb bodies of a round cross-section, but it is also possible to produce honeycomb bodies of other cross-sections, in particular cross-sections which are polygonal but rounded off at the corners, as long as the deviations from a circular shape are not very great, that is to say the individual sides are of similar length.

In order to wind a honeycomb body including, for example, three stacks, as is described in International Patent Publication WO 90/03220, corresponding to U.S. Pat. Nos.

5,139,844; 5,105,539 and 5,135,794, the former has three rectangular openings for the stack ends, which openings extend substantially parallel to the central axis. The individual stacks are introduced into the former through the individual openings. It is clear that each stack extends partially out of the former. The fork-like intertwining device engages each stack in a central region and intertwines the individual stacks relative to each other. The individual stacks slide through the openings during the winding operation. The winding operation is continued until all stacks have been drawn into the former.

In accordance with a further feature of the invention, the openings are disposed equidistantly from each other over the inner periphery of the former. That configuration is advantageous since it results in a honeycomb body which is wound or constructed symmetrically. If other winding results are to be achieved, that can be attained by virtue of suitable configurations of the openings.

During the winding operation the portions of the stacks which still project out of the former are pulled into the same. In accordance with an added feature of the invention, at least one longitudinal surface of at least one opening is of a convex cross-sectional configuration. This is done in order to minimize the friction between the stack and the wall of the openings, which occurs when each stack is pulled in. The configuration of a longitudinal surface results in line contact between the longitudinal surface and a surface of a stack, and such line contact minimizes the friction between the longitudinal surface of the opening and the stack.

In accordance with an additional feature of the invention, at least one longitudinal surface of at least one opening is provided with an anti-friction or slide layer. The friction between the stack and the longitudinal surface is further minimized thereby. In accordance with yet another feature of the invention, the slide layer is wear-resistant so that only a low degree of abrasion wear occurs between a stack and the longitudinal surface or slide layer. In accordance with yet a further feature of the invention, the slide layer has a ceramic material which is particularly suitable for this purpose. In accordance with yet an added feature of the invention, the slide layer is applied to the longitudinal surface by the plasma spray process.

In accordance with yet an additional feature of the invention, the internal width of each opening corresponds to the thickness of the stack.

In accordance with again another feature of the invention, there is provided a ram which is displaceable in the longitudinal direction of the former and in the same, in order to take the honeycomb body out of the former. In accordance with again a further feature of the invention, the ram has a cross-section corresponding to the internal cross-section of the former. That provides for the honeycomb body to be moved uniformly out of the former. As a result, the individual sheet metal layers of the honeycomb body are not displaced relative to each other.

In accordance with again a further feature of the invention, the former has an outside flange which preferably extends therearound and which is releasably connected to a base plate. In accordance with again an added feature of the invention, the base plate has an aperture and an actuating bar connected to the ram extends through the aperture. In accordance with again an added feature of the invention, in order to minimize the height of the apparatus, the base plate is provided with an opening through which the ram can be passed.

In accordance with again an additional feature of the invention, the intertwining or winding device has at least two winding bars which are disposed on a carrier and which can be brought into engagement with the stack or stacks for winding the honeycomb body. The winding bars can extend through the ram.

In order to be able to withstand the forces occurring in the intertwining operation, the winding bars must be relatively sturdy but on the other hand they should be as thin as possible so that large additional passages are not formed in the honeycomb body. A stabilizing effect for the winding bars is effected, for example, by an additional gripping action at the free ends of the winding bars after the sheet metal layers have been inserted.

In accordance with still another feature of the invention, a stabilizing effect is also provided by the winding bars being of a shape which differs from a round cross-section, in particular a cross-section with a drop-like shape or a curved drop-like shape. A drop-like shape also corresponds to the shape of the channels or passages that are produced at the winding bars which occurs in any case in the winding operation.

In accordance with still a further feature of the invention, the winding device grips the winding bars therein at both ends.

In accordance with still an added feature of the invention, the former and the winding device are rotatable relative to each other.

In accordance with still an additional feature of the invention, the former has a one-piece construction and it can be produced, for example, from a casting.

In accordance with another feature of the invention, the former is assembled from at least two former segments.

In accordance with a further feature of the invention, the stacks are folded around bend lines, and the at least one fork-like winding device has a number of winding bars corresponding to the number of stacks and an equal number of openings, for intertwining at least two stacks of sheet metal layers.

With the objects of the invention in view there is also provided a process for producing a honeycomb body having a multiplicity of fluid-permeable passages from a multiplicity of at least partially structured sheet metal layers, which comprises layering at least one stack from a multiplicity of at least partially structured sheet metal layers; introducing each stack into a former corresponding to an external shape of a honeycomb body to be produced; projecting at least one end of each stack out of the former through at least one opening; holding each stack with a winding or intertwining device disposed in a central region of the former; and intertwining all of the stacks to form a honeycomb body entirely filling the former by relative rotation of the winding or intertwining device and the former, causing the stack ends projecting out of the former to be pulled in the former.

This operating procedure eliminates a complicated series of movements. The process is simple and can be carried into effect without further difficulties. The former and/or the intertwining or winding device only have to be rotatable relative to each other.

In accordance with another mode of the invention, at least two stacks are layered from a multiplicity of at least partially structured sheet metal layers. Each stack is then folded around a respective bend line. Thereafter the stacks are introduced into a former corresponding to the external shape of the honeycomb body to be produced, and held in the former by a winding or intertwining device in a central region. Preferably, a winding bar is provided in the region of each bend line for that purpose.

In accordance with a concomitant mode of the invention, when the stacks are introduced into the former both ends of each stack project outwardly through the same respective opening.

Other features which are considered as characteristic for the invention are set forth in the appended claims.

Although the invention is illustrated and described herein as embodied in an apparatus and a process for producing a honeycomb body from intertwined sheet metal layers, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, plan view of an apparatus having three stacks to be wound;

FIGS. 2 and 3 are plan views showing instantaneous conditions during a windings operation;

FIG. 4 is a plan view showing a completely wound honeycomb body in a former;

FIG. 5 is an enlarged, fragmentary, plan view of a portion X shown in FIG. 1 without a stack; and FIG. 6 is a fragmentary, cross-sectional view of an apparatus.

DESCRIPTION OF THE PREFERRED EMBODIMENTS

Referring now to the figures of the drawings as a whole, there is seen an apparatus that includes a former 5 having a wall 11 in which three rectangular openings 8, 9 and 10 are provided. The openings 8, 9 and 10 are provided equidistantly relative to each other over an inner periphery of the former 5. As is seen in FIG. 6, the former 5 has a surrounding outside flange 13 at the outside of the wall 11 which is releasably connected to a base plate 14 by way of a non-illustrated connecting device such as, for example, screws. The base plate 14 has an aperture 15 formed therein through which a ram 16 can be passed by an actuating bar 17 connected to the ram. The cross-section of the aperture 15 and the ram 16 corresponds to the internal cross-section of the former 5.

As is seen in FIG. 5, the wall 11 has longitudinal surfaces 12, 12' at the openings 8, 9 and 10 which have a convex cross-sectional configuration. The longitudinal surfaces 12, 12' are each provided with a respective anti-friction or slide layer 18, 19 which involves a slide layer of ceramic material.

FIGS. 1 to 6 show a twisting, winding or intertwining device which can rotate stacks 1, 2 and 3 about an axis 4 that is perpendicular to the plane of the drawing. The intertwining or winding device has winding bars 24, 25, 26 which engage into each stack 1, 2, 3 and rotate the same in a direction of rotation S of the intertwining device. Preferably, the winding bars have the cross-sectional shape of a curved drop which adapts to a channel shape that is produced anyway in the intertwining operation on the winding bar without requiring any additional space, and which at the same time can satisfactorily take up forces involved in the intertwining or twisting operation.

The three stacks 1, 2, 3 are disposed in the interior of the former 5 in FIG. 1. The stacks 1, 2, 3 are layered from a multiplicity of at least partially structured sheet metal layers. Each stack 1, 2, 3 is folded about a respective fold or bend line 21, 22, 23 indicated in FIG. 2. The stacks 1, 2 and 3 which are folded in such a way have been introduced into the former 5.

Each stack 1, 2 and 3 is held by an intertwining or twisting device in a central region 7 seen in FIG. 4. A respective winding bar 24, 25, 26 of the intertwining device is disposed in the region of each bend line 21, 22, 23. Two ends of each stack 1, 2, 3 project outwardly out of the former 5 through the same opening 8, 9, 10.

The individual stacks 1, 2 and 3 are twisted or intertwined in the same direction by rotation of the winding bars 24, 25, 26 about the central axis 4 in the direction S. During the winding operation, the stacks 1, 2 and 3 slide along the slide layers 18, 19 into the interior of the former 5, as can be learned from the view of FIG. 3.

FIG. 4 shows a fully wound honeycomb body 6 in which the stacks 1,. 2 and 3 are wound around each other and around the central region 7.

The finished wound honeycomb body 6 can be pushed out of the fixed former 5 through the use of the ram 16. While the honeycomb body 6 is being moved out of the former, the honeycomb body can be introduced into a housing or casing disposed above the former 5. In the winding operation, it is immaterial whether the winding device, the former or both are rotated in opposite directions, since the only important consideration is the relative movement with respect to each other. In that way it is also possible to produce non-circular cross-sections for the honeycomb body as long as the deviation from the circular shape is not too great. The invention is suitable for the production of metallic honeycomb bodies, which can be carried out inexpensively and at low tooling costs.

I claim:

1. An apparatus for producing a honeycomb body, comprising:
   at least one fork-like winding device for engaging a stack of a multiplicity of at least partially structured sheet metal layers forming a multiplicity of fluid-permeable passages, said winding device rotatably mounted about a central axis; and
   a former surrounding said winding device and having an invariable internal contour corresponding to an external contour of a honeycomb body to be produced from the stack, said former having a wall with at least one opening formed therein, said opening extending substantially parallel to the central axis.

2. The apparatus according to claim 1, wherein said wall has at least two openings formed therein.

3. The apparatus according to claim 2, wherein said openings are disposed equidistantly relative to each other over an inner periphery of said former.

4. The apparatus according to claim 1, wherein said wall has at least one longitudinal surface with a convex cross-section at said at least one opening.

5. The apparatus according to claim 4, wherein said at least one longitudinal surface has a slide layer.

6. The apparatus according to claim 5, wherein said slide layer is wear-resistant.

7. The apparatus according to claim 6, wherein said slide layer is formed of a ceramic material.

8. The apparatus according to claim 5, wherein said slide layer is plasma-sprayed.

9. The apparatus according to claim 1, wherein each stack has a given thickness, and each opening has a width approximately corresponding to the given thickness.

10. The apparatus according to claim 1, including a ram displaceable in longitudinal direction of said former and in said former.

11. The apparatus according to claim 10, wherein said former has a given inner cross-section, and said ram has a cross-section corresponding to said given inner cross-section.

12. The apparatus according to claim 1, including a base plate, said former having an at least partially encompassing outside flange to be releasably connected to said base plate.

13. The apparatus according to claim 12, including an actuating bar connected to said ram and extending through an aperture formed in said base plate.

14. The apparatus according to claim 12, wherein said base plate has an aperture formed therein through which said ram can be passed.

15. The apparatus according to claim 1, wherein said winding device has at least two winding bars to be brought into engagement with said stack.

16. The apparatus according to claim 15, including a carrier on which said winding bars are disposed for bringing said winding bars into engagement with said stack.

17. The apparatus according to claim 15, wherein said winding bars have a cross-section which is adapted to intertwining forces and is as small as possible.

18. The apparatus according to claim 15, wherein said cross-section of said winding bars is in the shape of a drop or a curved drop.

19. The apparatus according to claim 15, wherein said winding device grips said winding bars therein at both ends.

20. The apparatus according to claim 1, wherein said former and said winding device are rotatable relative to each other.

21. The apparatus according to claim 1, wherein said former is of one-piece construction.

22. The apparatus according to claim 1, wherein said former includes at least two former segments.

23. The apparatus according to claim 1, wherein the stacks are folded around bend lines, and said at least one fork-like winding device has a number of winding bars corresponding to the number of stacks and an equal number of openings, for intertwining at least two stacks of sheet metal layers.

\* \* \* \* \*